United States Patent
Zhang

(10) Patent No.: US 9,244,236 B2
(45) Date of Patent: Jan. 26, 2016

(54) METHOD FOR MAKING A PHOTONIC INTEGRATED CIRCUIT HAVING A PLURALITY OF LENSES

(71) Applicant: STMicroelectronics, Inc., Coppell, TX (US)

(72) Inventor: John Hongguang Zhang, Fishkill, NY (US)

(73) Assignee: STMicroelectronics, Inc., Coppell, TX (US)

(*) Notice: Subject to any disclaimer, the term of this patent is extended or adjusted under 35 U.S.C. 154(b) by 0 days.

(21) Appl. No.: 14/802,504

(22) Filed: Jul. 17, 2015

(65) Prior Publication Data

US 2015/0323739 A1 Nov. 12, 2015

Related U.S. Application Data

(62) Division of application No. 13/086,252, filed on Apr. 13, 2011, now Pat. No. 9,116,319.

(60) Provisional application No. 61/424,499, filed on Dec. 17, 2010.

(51) Int. Cl.
| | |
|---|---|
| G02B 6/42 | (2006.01) |
| G02B 6/43 | (2006.01) |
| G02B 6/122 | (2006.01) |
| G02B 6/124 | (2006.01) |
| G02B 6/132 | (2006.01) |
| G02B 6/136 | (2006.01) |
| G02B 6/12 | (2006.01) |

(52) U.S. Cl.
CPC .......... *G02B 6/43* (2013.01); *G02B 6/122* (2013.01); *G02B 6/124* (2013.01); *G02B 6/132* (2013.01); *G02B 6/136* (2013.01); *G02B 6/42* (2013.01); *G02B 6/4214* (2013.01); *G02B 2006/12102* (2013.01)

(58) Field of Classification Search
None
See application file for complete search history.

(56) References Cited

U.S. PATENT DOCUMENTS

| | | | |
|---|---|---|---|
| 2002/0118907 A1* | 8/2002 | Sugama | G02B 6/12002 385/14 |
| 2005/0259927 A1* | 11/2005 | Kato | G02B 6/4204 385/93 |

* cited by examiner

*Primary Examiner* — Hemang Sanghavi
(74) *Attorney, Agent, or Firm* — Gardere Wynne Sewell LLP

(57) ABSTRACT

A photonic integrated circuit includes optical circuitry fabricated over an underlying circuitry layer. The optical circuitry includes a dielectric material having recesses disposed within, layers of a light waveguide material deposited within the recesses, and lenses disposed over each layer of waveguide material. The underlying circuitry layer may include, for example, a semiconductor wafer as well as circuitry fabricated during front end of line (FEOL) semiconductor manufacturing such as, for example, sources, gates, drains, interconnects, contacts, resistors, and other circuitry that may be manufactured during FEOL processes. The underlying circuitry layer may also include circuitry manufactured during back end of line semiconductor manufacturing processes such as, for example, interconnect structures, metallization layers, and contacts.

27 Claims, 15 Drawing Sheets

METHOD FOR MAKING A PHOTONIC INTEGRATED CIRCUIT HAVING A PLURALITY OF LENSES

CROSS-REFERENCE TO RELATED APPLICATION

This application is a divisional application from U.S. application for patent Ser. No. 13/086,252 filed Apr. 13, 2011, which claims the benefit of U.S. Provisional Application for Patent No. 61/424,499 filed Dec. 17, 2010, the disclosures of which are incorporated by reference.

BACKGROUND

1. Technical Field

The present invention relates generally to photonic integrated circuits having on-chip optical interconnects and, more specifically, to a photonic integrated circuit having a plurality of lenses and a method for making the same.

2. Introduction

The advancement of integrated circuit technology yields circuitry of increasingly smaller sizes with increased processing capabilities. However, conventional circuitry integrating copper lines with ultra-low K (ULK) dielectric materials experiences many problems as the copper lines are integrated with the ULK dielectric during back end of line (BEOL) semiconductor manufacturing. Many of these problems are attributed to the continued shrinkage of the copper line and the integration of the copper line with ULK materials. For example, as the copper lines shrink, current density of the copper line is increased, leaving such circuitry susceptible to electromigration of the copper line. Additionally, as the critical dimension of the copper line decreases with the shrinkage of the copper line, the copper/ULK integration becomes increasingly difficult to implement due to factors such as dielectric flop over, film cracking, and time dependent dielectric breakdown (TDDB).

One solution for addressing the shortcomings of copper/ULK integrated circuits is to replace the copper line formed during BEOL with a technology that provides on-chip integration of ultra-small circuits for manipulating light signals similar to the way electrical signals are manipulated in the chip. Such circuitry, known as photonic integrated circuitry or integrated optical circuitry, allows for the controlled manipulation (also referred to herein as "propagation") of photons of incident light along a waveguide, thus providing on-chip ultra-dense integration. However, conventional photonic integrated circuitry is susceptible to noise and signal loss caused by a severe reduction in the propagation of the light along the waveguide. Therefore, there exists a need for photonic integrated circuitry that can improve light propagation along the waveguide while accommodating the demands of integrated circuitry advancement.

SUMMARY

The present disclosure provides a photonic integrated circuit for enhancing light propagation along the waveguide. The disclosed photonic integrated circuit comprises optical circuitry, wherein said optical circuitry comprises a layer of dielectric material, one or more recesses disposed within said layer of dielectric material, a layer of a light waveguide material deposited within each of the one or more recesses, and a lens disposed over a first surface of each layer of waveguide material within each of the one or more recesses. In an embodiment of the disclosure, the lenses may be of various curvatures. In another embodiment, the optical circuit may further include a light barrier cladding layer deposited between the light waveguide material and a sidewall of each recess to further enhance light propagation throughout the waveguide material. In one embodiment, the light barrier cladding layer may comprise a single layer of a high refractive index core material; and in another embodiment, the light barrier cladding layer may comprise one or more alternating layers of a low refractive index core material and a high refractive index Bragg cladding material.

The present disclosure also provides a method for fabricating a photonic integrated circuit, wherein the method comprises depositing a layer of dielectric material over underlying circuitry, forming recesses within the dielectric layer, depositing a light waveguide material within the recesses, polishing the light waveguide material, depositing a lens material over said light waveguide material, and polishing the lens material to produce one or more lenses having an upper surface with an upper surface curvature and a lower surface with a lower surface curvature. In some embodiments, the preceding steps may be repeated one or more times to produce a plurality of lenses within the optical circuit. In embodiments having a light barrier cladding layer, the light barrier cladding layer may be deposited between the layer of light waveguide material and a sidewall of a recess. In some embodiments, one or more of the lens curvatures may include concave, convex, plano-convex, plano-concave, biconvex, biconcave, bi-planar, positive meniscus or negative meniscus.

In yet another embodiment of the present disclosure, a photonic integrated circuit is disclosed comprising first circuitry and optical circuitry disposed over the first circuitry, wherein the optical circuitry comprises a first layer of dielectric material, a plurality of first recesses disposed within the first layer of dielectric material, a first layer of waveguide material deposited within one or more of the plurality of first recess, said waveguide material operable to propagate light, a first lens disposed over one or more first layers of waveguide material, a second layer of dielectric material having a plurality of second recesses, wherein one or more of the second recesses are disposed over a first lens, a second layer of waveguide material deposited within one or more of the plurality of second recesses, and a second lens disposed over one or more of the second layers of waveguide material. In some embodiments, the photonic integrated circuit further comprises a first cladding layer deposited between a first layer of waveguide material and a sidewall of a first recess. Additionally, some embodiments comprise a second cladding layer deposited between a second layer of waveguide material and a sidewall of a second recess.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures not drawn to scale, in which like reference numbers indicate similar parts, and in which.

DETAILED DESCRIPTION

The present disclosure provides a photonic integrated circuit having a plurality of lenses and a method for making the same. The photonic integrated circuit is generally comprised of optical circuitry fabricated over an underlying circuitry layer, wherein the optical circuitry is fabricated during BEOL semiconductor manufacturing. The underlying circuitry layer may include, for example, a semiconductor wafer as well as circuitry fabricated during front end of line (FEOL) semiconductor manufacturing such as, for example, sources, gates, drains, interconnects, contacts, resistors, and other circuitry that may be manufactured during FEOL processes. The underlying circuitry layer may also include circuitry manufactured during BEOL processes such as, for example, interconnect structures, metallization layers, and contacts. In some embodiments, the optical circuitry includes a dielectric material having recesses disposed within, layers of a light waveguide material deposited within the recesses, and lenses disposed over each layer of waveguide material. The disclosed photonic integrated circuit may also include additional circuitry such as, for example, photonic sources, photonic drains, light sources, photodetectors, and one or more metallization layers.

As discussed in greater detail below, the light propagation along the waveguide may be enhanced by many factors including, for example: (a) the inclusion of a light barrier, (b) the type of light barrier, (c) the curvature of the lenses, (d) the materials comprising the waveguide, or (e) a combination of the foregoing. Each layer of waveguide material provides a waveguide (e.g., a nano waveguide) for propagating incident light provided by a light source known in the art such as, for example, a laser source. The lenses may be polished in accordance with the present disclosure to have a particular curvature for providing a desired refraction of the incident light, thus directing it along the waveguide material. By selectively controlling the curvature of each of the lenses, the refraction and propagation of incident light can be controlled within the disclosed photonic integrated circuit.

Figure 1:
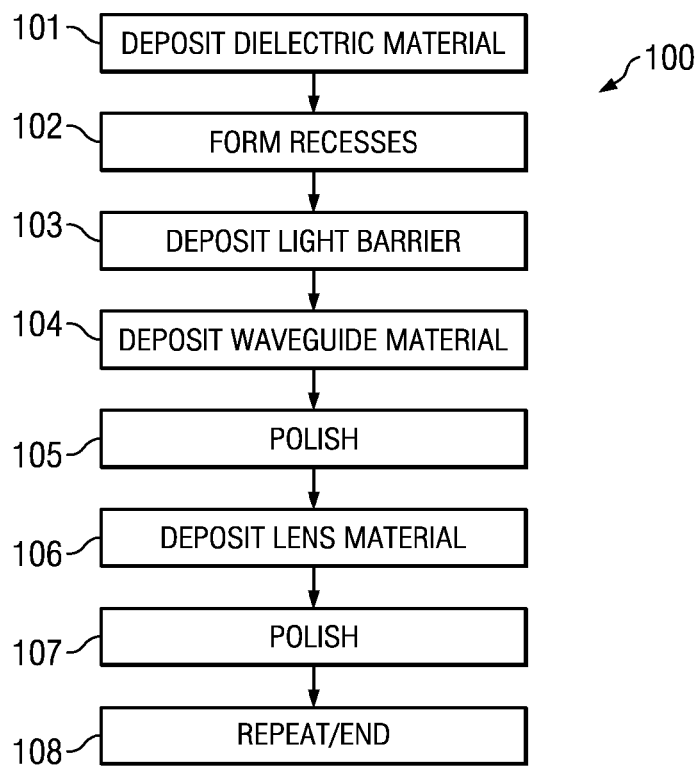
FIG. 1 illustrates a flowchart describing an example method for fabricating an example embodiment of a photonic integrated circuit in accordance with the present disclosure.
Figure 2:
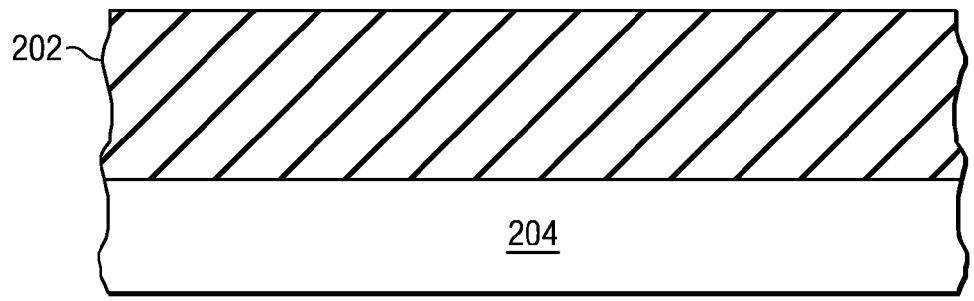
FIG. 2 illustrates a partial, cross-sectional view of an example embodiment of a photonic integrated circuit in accordance with the flowchart provided in FIG. 1.

FIG. 1 illustrates a flowchart 100 disclosing an example method for fabricating an embodiment of the disclosed photonic integrated circuit having one or more vertical waveguides. FIG. 2 illustrates a partial, cross-sectional view of an example embodiment of the present disclosure, in accordance with step 101 of FIG. 1, wherein a layer of dielectric material 202 is deposited over an underlying circuitry layer 204. The type of dielectric material deposited in step 101 is typically selected dependent upon the wavelength of light incident upon the optical circuitry and, in some embodiments, may comprise, for example, silicon nitride or silicon oxide. The underlying circuitry layer 204 shown in FIG. 2 is illustrated as a generic layer and, as mentioned above, may include a semiconductor wafer and may comprise circuitry fabricated during FEOL and/or BEOL semiconductor manufacturing processes. Although it is not shown in FIG. 2, in some embodiments, the underlying circuitry layer 204 may also comprise optical circuitry.

Figure 3:
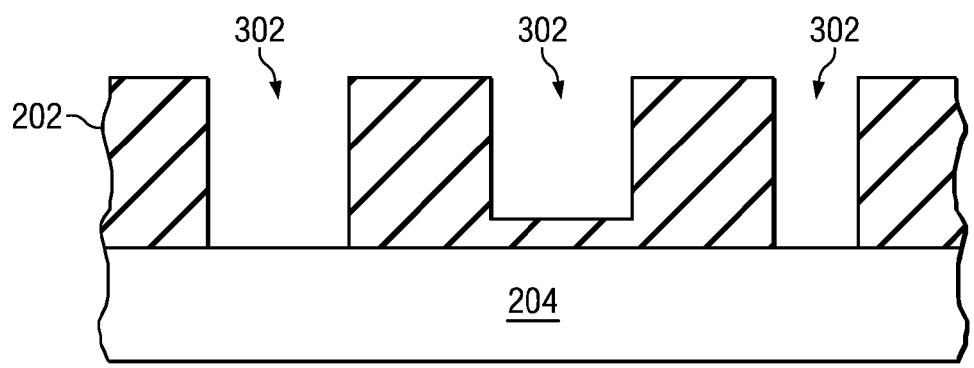
FIG. 3 illustrates a partial, cross-sectional view of the example embodiment of the photonic integrated circuit shown in FIG. 2 in accordance with the flowchart provided in FIG. 1.

As mentioned in step 102 of FIG. 1, and illustrated in FIG. 3, recesses 302 are formed in the dielectric material 202. As shown in FIG. 3, the recesses 302 may be of varying sizes and depths, and may be formed by any means known in the art such as, for example, etching. Although it is not shown in FIG. 3, in some embodiments the recesses may be formed so that they extend into the underlying circuitry layer 204.

Figure 4A:
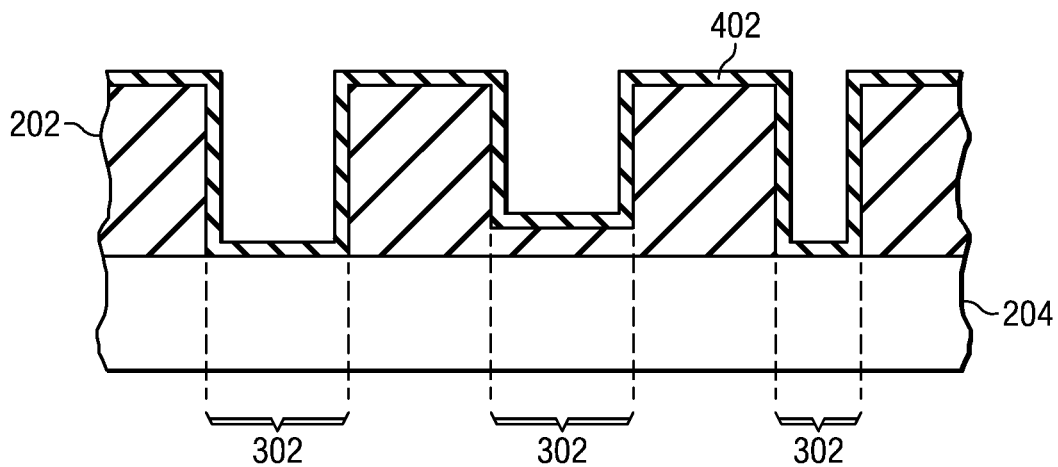
FIGS. 4A-4C illustrate partial, cross-sectional views of various embodiments of the disclosed photonic integrated circuit each having a light barrier deposited within their respective recesses.
Figure 4B:
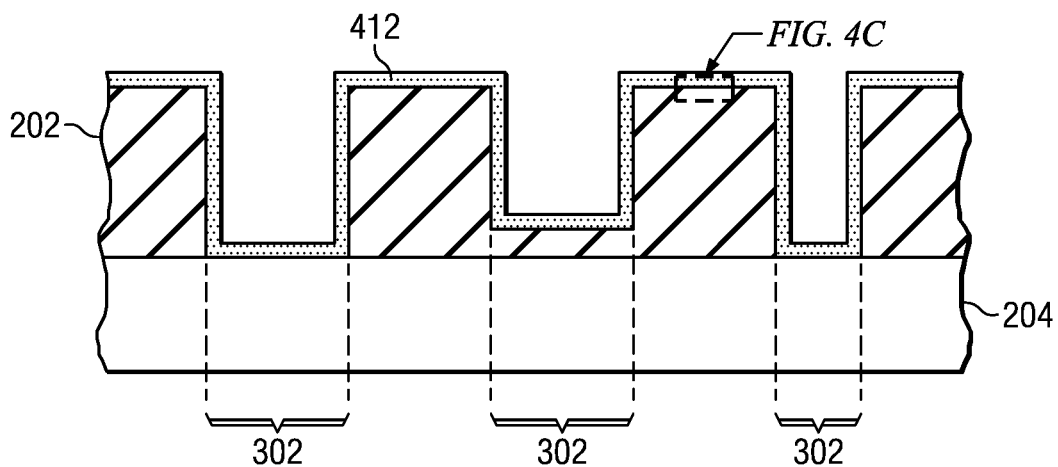
Figure 4C:
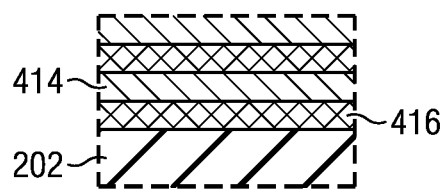

In accordance with step 103 of FIG. 1, a light barrier may be deposited along the sidewalls (i.e., a side or bottom surface) of one or more of the recesses 302, wherein the light barrier is designed to prevent photon loss during light propagation by reflecting light along the waveguide of a subsequently-deposited waveguide material (see step 104 of FIG. 1). FIGS. 4A, 4B, and 4C illustrate partial, cross-sectional views of various embodiments of the disclosed photonic integrated circuit having a light barrier, which may also be referred to as a cladding layer, deposited within the recesses 302. Some embodiments of the present disclosure may not include step 103. Although it is not shown, it should be appreciated that any unwanted light barrier material (e.g., light barrier material deposited other than along a sidewall of a recess) may be removed by a means known in the art such as, for example, etching or polishing.

Figure 6A:
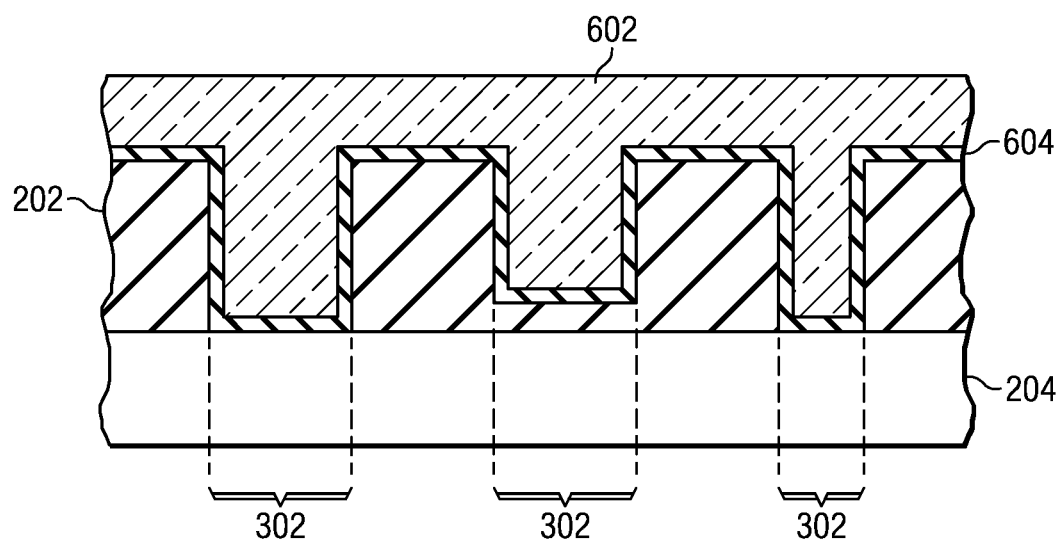
FIG. 6A illustrates a partial, cross-sectional view of an embodiment of the disclosed photonic integrated circuit having a layer of waveguide material deposited within the recesses.

In the embodiment illustrated in FIG. 4A, a light barrier 402 is deposited via low pressure chemical vapor deposition (LPCVD) as a single layer over the dielectric material 202 such that the light barrier 402 lines, at least, the sidewalls of the recesses 302. In this embodiment, there exists a critical angle ($\theta_c$) which is the angle of incidence above which total internal reflection occurs. In other words, the embodiment illustrated in FIG. 4A is dependent upon the angle of the incident light (i.e., the critical angle $\theta_c$) for total internal reflection. The critical angle $\theta_c$ is determined by the refractive index of the cladding material (in this embodiment, the light barrier 402) and the core material (a subsequently deposited waveguide material) in accordance with the following equation:

$$\theta_c = \arcsin\left(\frac{n_2}{n_1}\right),$$

wherein $n_2$ is the refractive index of the cladding layer (light barrier 402), and $n_1$ is the refractive index of the core layer (e.g., waveguide material 602 in FIG. 6A). It should be appreciated by those of ordinary skill in the art that total internal reflection occurs when ($n_2/n_1$)<1, or $n_2$<$n_1$. Accordingly, in the embodiment illustrated in FIG. 4A, the light barrier 402 comprises a material having a refractive index ($n_{barrier}$) less than the refractive index ($n_A$) of the dielectric material 202. The light barrier 402 in FIG. 4A also has a refractive index less than the refractive index ($n_B$) of a light waveguide material subsequently deposited over the light barrier 402 (e.g., waveguide material 602 in FIG. 6A). For example, if the wavelength of the incident light is 1550 nm, the dielectric material 202 could comprise silicon nitride ($n_A$=2.0), the waveguide material could comprise poly silicon ($n_B$=3.5), and the light barrier 402 could comprise silicon oxide ($n_{barrier}$=1.5).

In the embodiment illustrated in FIGS. 4B and 4C, a light barrier 412 is comprised of alternating layers of a Bragg cladding material 414 and an alternate cladding material 416 having a refractive index less than that of the Bragg cladding material 414. Unlike the embodiment in FIG. 4A, the reflection obtained by the embodiment illustrated in FIGS. 4B and 4C is not dependent upon the angle of incident light. Instead, the light barrier 412 in FIG. 4B may be considered a Bragg reflector having reflectivity R calculated in accordance with the following equation:

$$R = \left[\frac{n_o(n_2)^{2N} - n_s(n_1)^{2N}}{n_o(n_2)^{2N} + n_s(n_1)^{2N}}\right]^2,$$

wherein $n_o$, $n_1$, $n_2$ and $n_s$ are the respective refractive indices of the originating medium (subsequently deposited waveguide material), the two alternating materials (alternate cladding material 416 and Bragg cladding material 414 shown in FIG. 4C), and the terminating medium (e.g., the dielectric material 202 or substrate 204, depending on the depth of the respective recess 302); and N is the number of repeated pairs of low/high refractive index materials. The bandwidth ($\Delta\lambda_0$) of the photonic stop-band of the light barrier 412 is calculated in accordance with the following equation:

$$\Delta\lambda_0 = \frac{4\lambda_o}{\pi}\arcsin\left(\frac{n_2 - n_1}{n_2 + n_1}\right),$$

wherein $\lambda_o$ is the central wavelength of the band (e.g., incident light). In accordance with the foregoing equations, since a positive bandwidth $\Delta\lambda_0$ exists when $n_2$>$n_1$, $n_1$ represents the refractive index of the alternate cladding material 416, and $n_2$ represents the refractive index of the Bragg cladding material 414. Thus, in the embodiment illustrated in FIGS. 4B and 4C, the alternate cladding material 416 comprises the first, or innermost, layer of the light barrier 412, and the Bragg cladding material 414 is deposited over the alternate cladding material 416.

Figure 5:
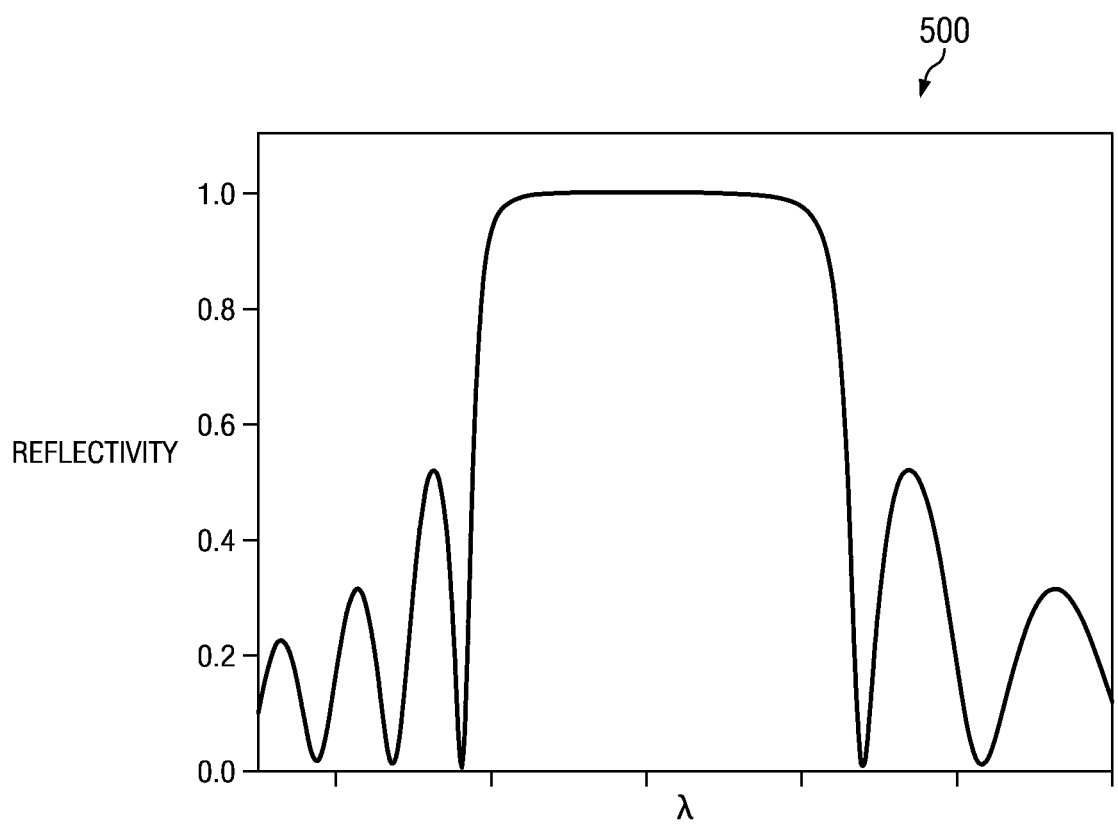
FIG. 5 illustrates a graph of a general relationship between reflectivity and the wavelength of incident light.

Referring briefly to FIG. 5, a graph 500 is provided to illustrate a general relationship between reflectivity and the wavelength of incident light. Thus, it is apparent that total reflectivity (R=1) is also dependent upon the wavelength of the incident light and, as such, the materials selected for the light barrier 412 are also dependent upon the wavelength of the incident light. Therefore, a change in either the Bragg cladding material 414 or the alternate cladding material 416 may result in different values for $n_1$ and $n_2$, which may cause a shift in the total reflective (R=1) bandwidth $\Delta\lambda_0$. For example, if the alternate cladding material 416 comprises silica (n=1.5) and the Bragg cladding material 414 comprises titanium dioxide (n~2.5), the bandwidth $\Delta\lambda_0$ will be about 200 nm for incident light having a wavelength of approximately 630 nm.

In another example embodiment, the alternate cladding material 416 may comprise the dielectric material 202. In this example embodiment, the dielectric material 202 is selected to be a material having a refractive index ($n_A$) less than the refractive index ($n_{Bragg}$) of the Bragg cladding material 414 (to maintain $n_2$>$n_1$ as explained above). The refractive index $n_A$ is also greater than the refractive index ($n_B$) of a light waveguide material subsequently deposited over the light barrier 412. For example, if the wavelength of the incident light is 1550 nm, the dielectric material 202 (which is also the alternate cladding material 416) could comprise silicon nitride ($n_A$=2.0), the waveguide material could comprise silicon oxide ($n_B$=1.5), and the Bragg cladding material 414 could comprise poly silicon ($n_{Bragg}$=3.5).

In embodiments having light barriers comprising alternating layers, such as those described above and illustrated in FIGS. 4B and 4C, the innermost layer of the light barrier is comprised of a material having a refractive index less than the refractive index of the Bragg cladding material. Thus, the light barrier 412 may be deposited via LPCVD of the alternate cladding material 416 followed by LPCVD of the Bragg cladding material 414, and repeating the deposition process for a given number of iterations. In the embodiment illustrated in FIGS. 4B and 4C, alternating layers of Bragg cladding material 414 and the alternate cladding material 416 may be deposited, for example, until approximately six layers of cladding material are deposited within the recesses 302 with the bottom cladding layer comprising the alternate cladding material 416 and the top cladding layer comprising the Bragg cladding material 414. In embodiments in which six or more pairs of layers are deposited, the outermost layer of cladding material may be either the alternate cladding material 416 or the Bragg cladding material 414. It should be appreciated that embodiments in which the alternate cladding material 416 comprises the dielectric material 202, it may not be necessary to deposit a first layer of alternate cladding material 416 (i.e., dielectric material 202) over the existing dielectric material 202 before depositing the Bragg cladding material 414 if the existing dielectric material 202 is able to essentially provide the first layer of alternate cladding material 416. Because the embodiments described or illustrated in accordance with FIGS. 4B and 4C are not dependent upon the angle of the incident light, they may be especially useful for applications in which the incident light is controlled to bend such as, for example, in light-switching or light-connection applications.

Figure 6B:
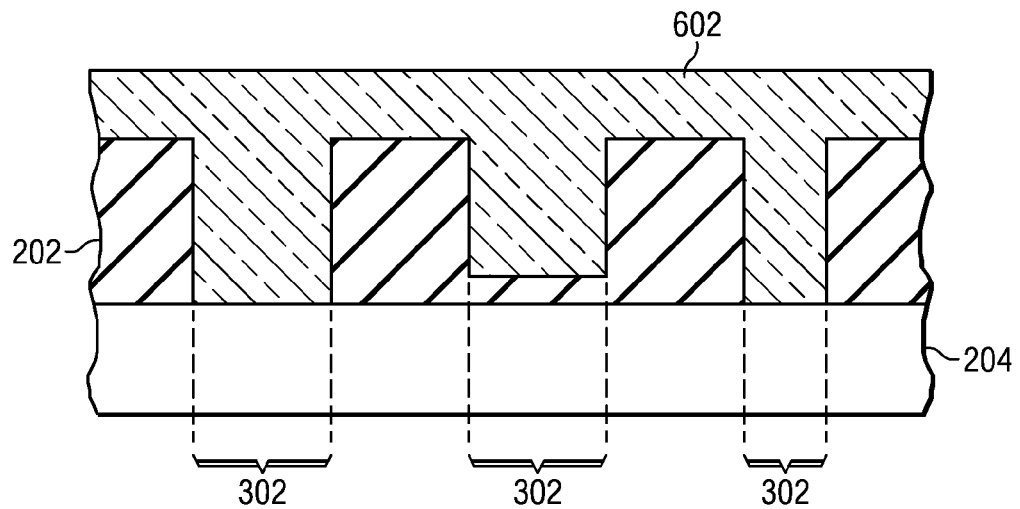
FIG. 6B illustrates a partial, cross-sectional view of an embodiment of the disclosed photonic integrated circuit having a layer of waveguide material deposited over dielectric material.

FIG. 6A provides a partial, cross-sectional view of an embodiment of the disclosed photonic integrated circuit in accordance with step 104 of FIG. 1, wherein a layer of waveguide material 602 is deposited at least along the sidewalls of the recesses 302 via a LPCVD process. In the embodiment illustrated in FIG. 6A, the layer of waveguide material 602 is deposited over a light barrier 604, wherein the light barrier 604 may be a single cladding layer (for example, see FIG. 4A) or multiple cladding layers (for example, see FIG. 4B). Although the embodiment shown in FIG. 6A includes a light barrier 604, it should be understood that other embodiments may not include a light barrier and, as such, the waveguide material 602 may be deposited in the recesses 302 over the dielectric material 202. FIG. 6B illustrates such an embodiment, wherein the layer of waveguide material 602 is deposited in the recesses 302 over the dielectric material 202.

As mentioned above with respect to FIGS. 4A, 4B, and 4C, the materials selected for the waveguide material 602 in FIG. 6A may depend, for example, upon the type of light barrier 604 used in the photonic integrated circuit. For example, if the light barrier 604 is comprised of a single layer (as shown in FIG. 4A), then the waveguide material 602 may be selected to have a refractive index ($n_B$) greater than the refractive index ($n_A$) of the dielectric material 202, and greater than the refractive index ($n_{barrier}$) of the light barrier 604. For example, if the wavelength of the incident light is 1550 nm, the dielectric material could comprise silicon nitride ($n_A$=2.0), the light barrier 604 could comprise silicon oxide ($n_{barrier}$=1.5), and the waveguide material 602 could comprise poly silicon ($n_B$=3.5). Alternatively, if the light barrier 604 is comprised of multiple cladding layers (as shown in FIG. 4B), then the waveguide material 602 may be selected to have a refractive index ($n_B$) less than the refractive index ($n_A$) of the dielectric material 202, and less than the refractive index ($n_{barrier}$) of the materials comprising the light barrier 504. For example, if the wavelength of the incident light is 1550 nm, the dielectric material is silicon nitride ($n_A$=2.0), and the light barrier 604 is comprised of alternating layers of poly silicon (n=3.5) and dielectric material 202 ($n_A$=2.0, $n_{barrier}$=2.0, 3.5), then the waveguide material 602 could comprise, for example, silicon oxide ($n_B$=1.5).

If no light barrier is provided such as, for example, in the embodiment illustrated in FIG. 6B, then the waveguide material 602 may be selected to have a refractive index ($n_B$) greater than the refractive index ($n_A$) of the dielectric material 202. For example, if the wavelength of the incident light is 1550 nm, then the dielectric material 202 could comprise silicon oxide ($n_A$=1.5) and the waveguide material 602 could comprise poly silicon ($n_B$=3.5). It should be appreciated that the disclosed dielectric, waveguide, and cladding materials are provided as one or more examples, and are not intended to limit the scope of the disclosed photonic integrated circuit as set forth in the appended claims. As such, different materials may be selected for the dielectric, waveguide, and cladding materials as long as they correspond with the disclosed limitations determined based upon certain variables including, for example, the wavelength of the incident light, the presence or absence of a light barrier, the type of light barrier, the materials comprising the light barrier, and the refractive indexes of the selected materials.

Figure 7A:
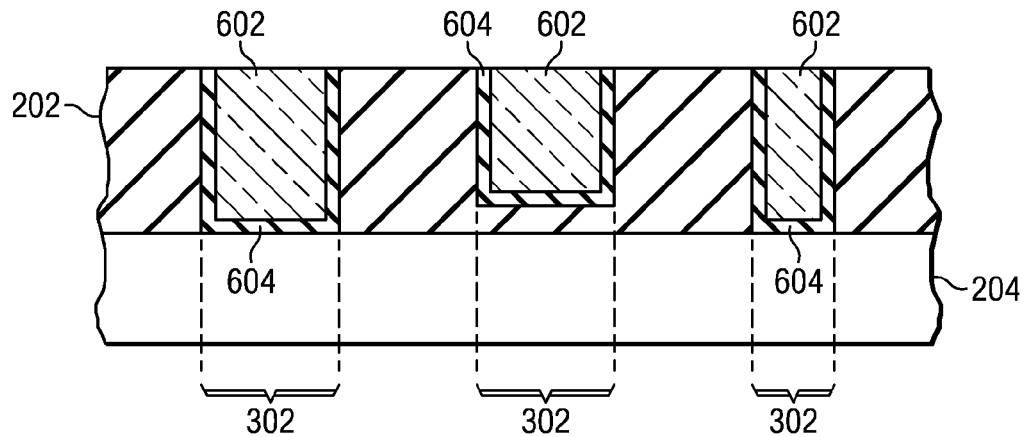
FIGS. 7A-7E illustrate partial, cross-sectional views of example embodiments of the disclosed photonic integrated circuit wherein the waveguide material has been polished to provide a curvature dishing within each recess.

FIGS. 7A-7E illustrate the example embodiment of the disclosed photonic integrated circuit shown in FIG. 6A in accordance with step 105 of the flowchart 100 provided in FIG. 1, wherein the waveguide material 602 has been polished to provide a curvature dishing 702 within each recess 302. In general, the waveguide material 602 and, if it has not already been removed, any light barrier 604 material deposited over the top surface of the dielectric material 202 are polished until the top surface of the dielectric material 202 is exposed, as shown in FIG. 7A. The curvature dishing 702 is then formed, as shown in FIGS. 7B-7E, by polishing the waveguide material 602 at a first polishing rate, and polishing the dielectric material 202 (and light barrier 604) at a second polishing rate.

Figure 7B:
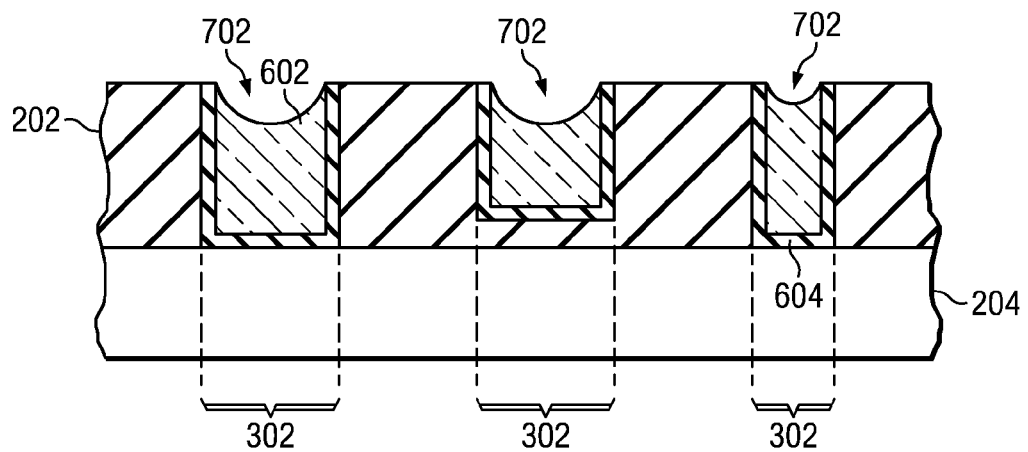
Figure 7C:
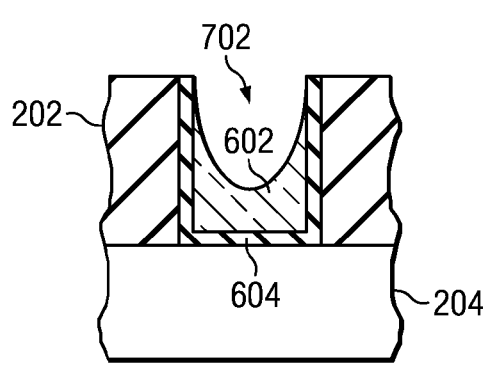
Figure 7D:
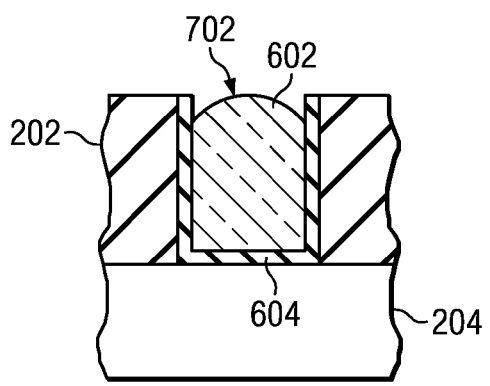
Figure 7E:
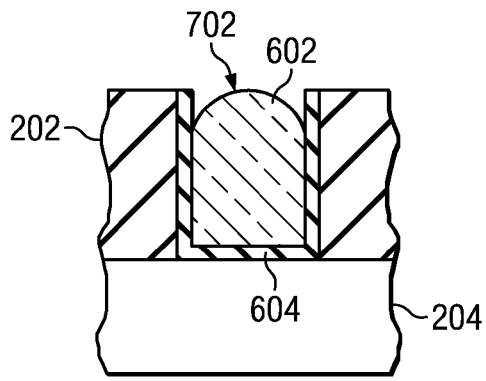

The curvature dishing 702 is a curvature of the top surface of the layer of waveguide material 602 in a particular recess 302, and may be controlled by varying the respective polish rates of the waveguide material 602 and the dielectric material 202, wherein the greater the difference between the respective polish rates, the more extensive the curvature dishing 702. For example, if the polish rate ($R_W$) of the waveguide material 602 is greater than the polish rate ($R_D$) of the dielectric material 202, then the curvature dishing 702 may be concave, as shown in FIG. 7B; and as the difference between $R_W$ and $R_D$ increases, the curvature dishing 702 becomes increasingly concave (i.e., the radius of curvature of the curvature dishing becomes shorter), as shown in FIG. 7C. Similarly, if the waveguide polish rate $R_W$ is less than the dielectric material polish rate $R_D$, then the curvature dishing may be convex, as shown in FIG. 7D; and as the difference between $R_W$ and $R_D$ increases, the curvature dishing becomes increasingly convex, as shown in FIG. 7E. If the waveguide polish rate $R_W$ is equal to the dielectric material polish rate $R_D$, then the curvature dishing may be planar, or flat, as shown in FIG. 7A. In an embodiment of the present disclosure, the polishing in step 105 may be performed, for example, by using a chemical mechanical polishing process.

Figure 8:
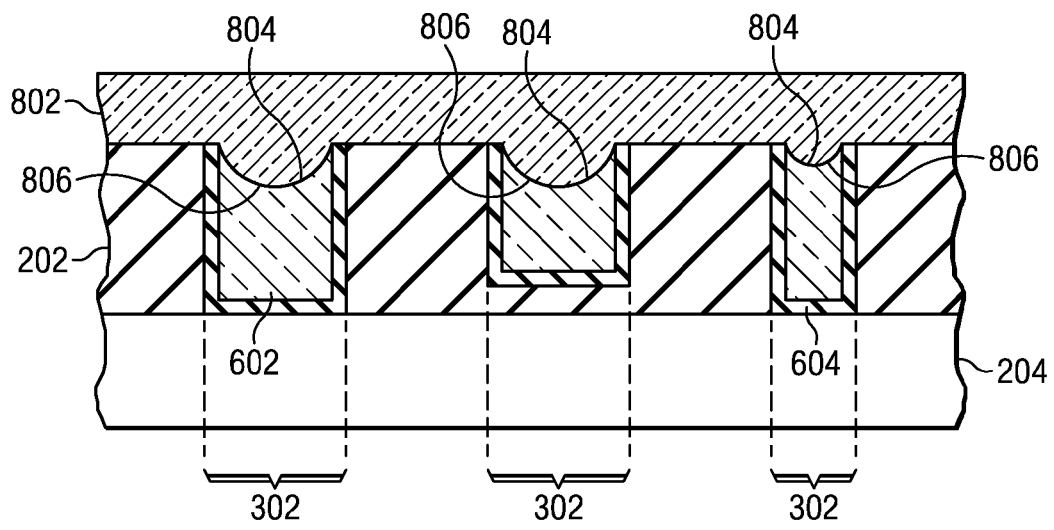
FIG. 8 illustrates a partial, cross-sectional view of an embodiment of the disclosed photonic integrated circuit having a lens material deposited over an uppermost layer of waveguide material.

FIG. 8 provides a partial, cross-sectional view of an embodiment of the disclosed photonic integrated circuit in accordance with step 106 of FIG. 1, wherein a lens material 802 is deposited over the waveguide material 602 via a LPCVD process. In an example embodiment of the present disclosure, the lens material 802 may comprise, for example, silicon nitride. As shown in FIG. 8, the lens material 802 conforms to the curvature dishing 806 of the layer of waveguide material 602 upon which the lens material 802 is disposed to create a lower lens surface curvature 804 conforming to the curvature dishing 806. Since the curvature dishing 806 provided in FIG. 8 is concave, then the lower lens surface curvature 804 is convex.

Figure 9:
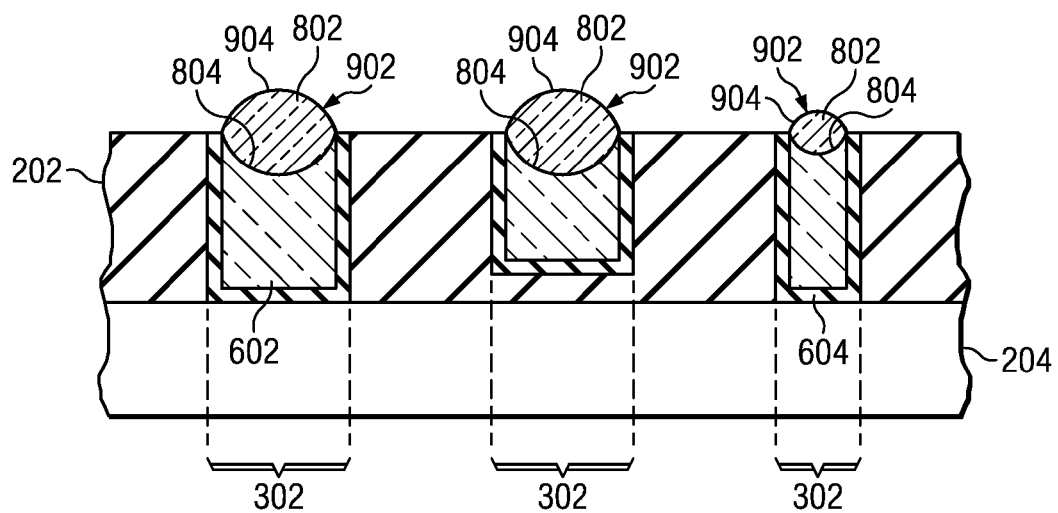
FIG. 9 illustrates a partial, cross-sectional view of an example embodiment of the disclosed photonic integrated circuit wherein the lens material has been polished to create lenses.

FIG. 9 illustrates the example embodiment of the disclosed photonic integrated circuit shown in FIG. 8 in accordance with an embodiment of step 107 of the flowchart 100 provided in FIG. 1, wherein the lens material 802 has been polished to create lenses 902. The lenses 902 have an upper lens surface curvature 904 that may be controlled by varying the respective polish rates of the dielectric material 202 and the lens material 802, wherein the greater the difference between the respective polish rates, the more extensive the upper lens surface curvature 904. For example, in the embodiment illustrated in FIG. 9, the polish rate ($R_L$) of the lens material 802 is less than the polish rate $R_D$, thereby producing lenses 902 having a convex upper lens surface curvature 904. The lenses 902 illustrated in FIG. 9 each have a convex lower lens surface curvature 804 and a convex upper lens surface curvature 904, thus producing biconvex lenses 902. The biconvex lenses 902 may be formed by polishing the waveguide material 602 at rate $R_W$, lens material 802 at rate $R_L$, and dielectric material 202 at rate $R_D$, wherein $R_L < R_D < R_W$. In an embodiment of the present disclosure, the polishing in step 107 may be performed, for example, by using a chemical mechanical polishing process.

Figure 10A:
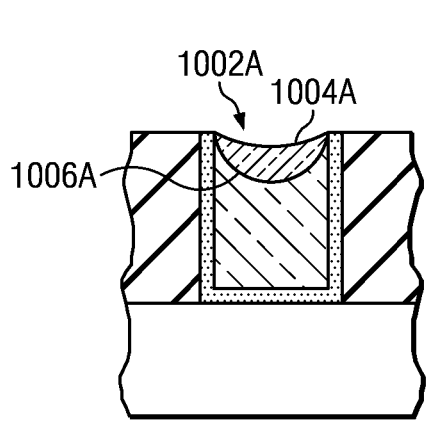
FIGS. 10A-10J illustrate various examples of lenses having an upper lens surface curvature and a lower lens surface curvature formed in accordance with the present disclosure.
Figure 10B:
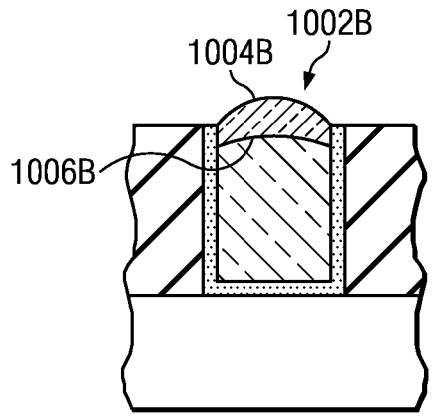

FIGS. 10A-10J illustrate various examples of lenses 1002 having an upper lens surface curvature 1004 and a lower lens surface curvature 1006, formed in accordance with the present disclosure. FIGS. 10A and 10B provide examples of positive meniscus lenses 1002A and 1002B. As shown in FIG. 10A, the example lens 1002A has a concave upper lens surface curvature 1004A and a convex lower lens surface curvature 1006A. The convex lower lens surface curvature 1006A has a radius of curvature that is smaller than that of the concave upper lens surface curvature 1004A, thus producing a positive meniscus lens 1002A. The positive meniscus lens 1002A may be formed by polishing the waveguide material at rate $R_W$, lens material at rate $R_L$, and dielectric material at rate $R_D$, wherein $R_D<R_L<R_W$. In FIG. 10B, the example lens 1002B has a convex upper lens surface curvature 1004B and a concave lower lens surface curvature 1006B. The convex upper lens surface curvature 1004B has a radius of curvature that is smaller than that of the concave lower lens surface curvature 1006B, thus producing a positive meniscus lens 1002B. The positive meniscus lens 1002B may be formed by polishing the waveguide material at rate $R_W$, lens material at rate $R_L$, and dielectric material at rate $R_D$, wherein $R_L<R_W<R_D$. The example embodiments illustrated in FIGS. 10A-10J include an example light barrier; therefore, when reference is made to polishing the dielectric material, it should be understood that the top surface of the light barrier is also polished at the same rate as that of the dielectric material.

Figure 10C:
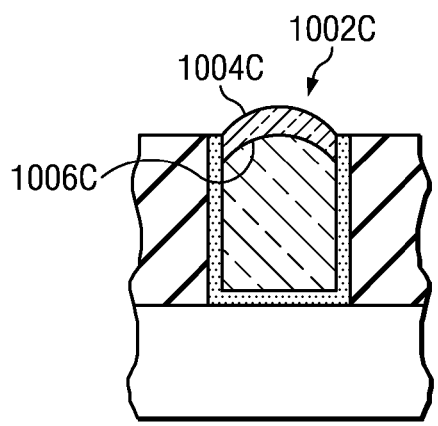
Figure 10D:
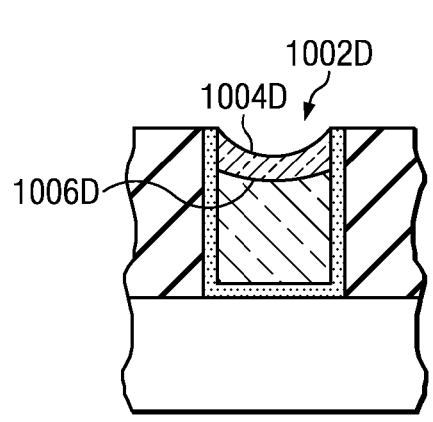

FIGS. 10C and 10D provide examples of negative meniscus lenses 1002C and 1002D. As shown in FIG. 10C, the example lens 1002C has a convex upper lens surface curvature 1004C and a concave lower lens surface curvature 1006C. The concave lower lens surface curvature 1006C has a radius of curvature that is smaller than that of the convex upper lens surface curvature 1004C, thus producing a negative meniscus lens 1002C. The negative meniscus lens 1002C may be formed by polishing the waveguide material at rate $R_W$, lens material at rate $R_L$, and dielectric material at rate $R_D$, wherein $R_W<R_L<R_D$. In FIG. 10D, the example lens 1002D has a concave upper lens surface curvature 1004D and a convex lower lens surface curvature 1006D. The convex lower lens surface curvature 1006D has a radius of curvature that is greater than that of the concave upper lens surface curvature 1004D, thus producing a negative meniscus lens 1002D. The negative meniscus lens 1002D may be formed by polishing the waveguide material at rate $R_W$, lens material at rate $R_L$, and dielectric material at rate $R_D$, wherein $R_D<R_W<R_L$.

Figure 10E:
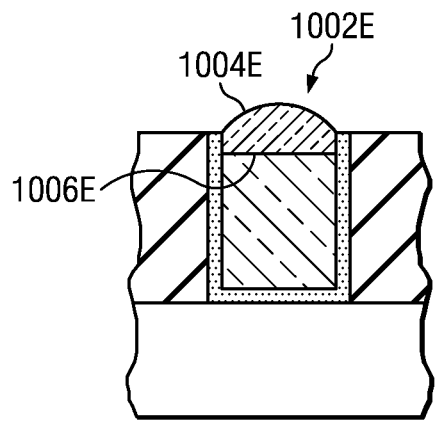
Figure 10F:
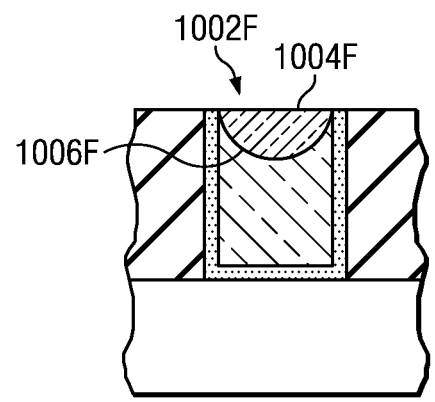

FIGS. 10E and 10F provide examples of plano-convex lenses 1002E and 1002F. As shown in FIG. 10E, the example lens 1002E has a convex upper lens surface curvature 1004E and a planar lower lens surface curvature 1006E, thus producing a plano-convex lens 1002E. The plano-convex lens 1002E may be formed by polishing the waveguide material at rate $R_W$, lens material at rate $R_L$, and dielectric material at rate $R_D$, wherein $R_L<R_W=R_D$. In FIG. 10F, the example lens 1002F has a planar upper lens surface curvature 1004F and a convex lower lens surface curvature 1006F, thus producing a plano-convex lens 1002F. The plano-convex lens 1002F may be formed by polishing the waveguide material at rate $R_W$, lens material at rate $R_L$, and dielectric material at rate $R_D$, wherein $R_W>R_L=R_D$.

Figure 10G:
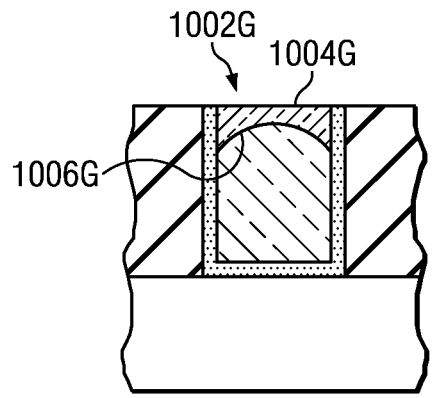
Figure 10H:
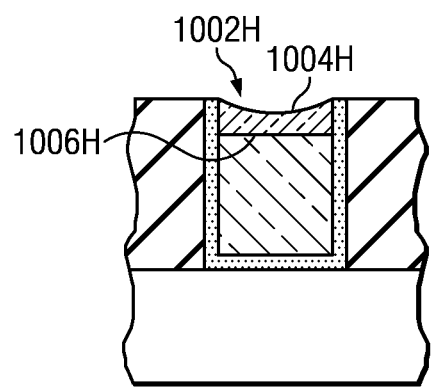

FIGS. 10G and 10H provide examples of plano-concave lenses 1002G and 1002H. As shown in FIG. 10G, the example lens 1002G has a planar upper lens surface curvature 1004G and a concave lower lens surface curvature 1006G, thus producing a plano-concave lens 1002G. The plano-concave lens 1002G may be formed by polishing the waveguide material at rate $R_W$, lens material at rate $R_L$, and dielectric material at rate $R_D$, wherein $R_W<R_L=R_D$. In FIG. 10H, the example lens 1002H has a concave upper lens surface curvature 1004H and a planar lower lens surface curvature 1006H, thus producing a plano-concave lens 1002H. The plano-concave lens 1002H may be formed by polishing the waveguide material at rate $R_W$, lens material at rate $R_L$, and dielectric material at rate $R_D$, wherein $R_L>R_W=R_D$.

Figure 10I:
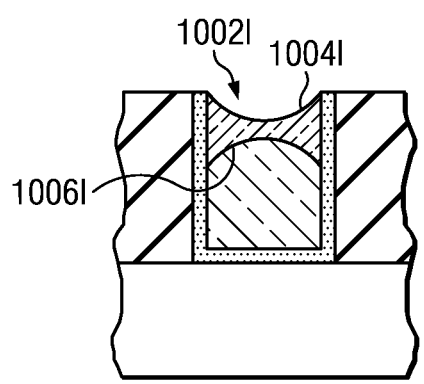
Figure 10J:
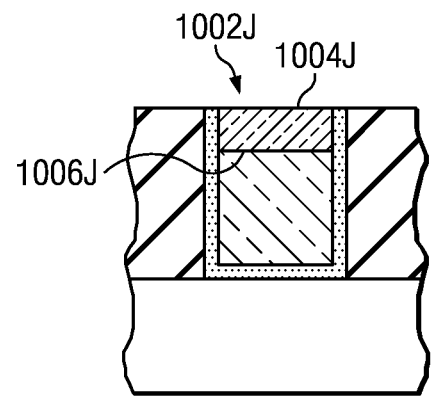

FIGS. 10I and 10J provide examples of a biconcave lens 1002I and a bi-planar lens 1002J, respectively. As shown in FIG. 10I, the example lens 1002I has a concave upper lens surface curvature 1004I and a concave lower lens surface curvature 1006I, thus producing a biconcave lens 1002I. The biconcave lens 1002I may be formed by polishing the waveguide material at rate $R_W$, lens material at rate $R_L$, and dielectric material at rate $R_D$, wherein $R_W<R_D<R_L$. In FIG. 10J, the example lens 1002J has a planar upper lens surface curvature 1004J and a planar lower lens surface curvature 1006J, thus producing a bi-planar lens 1002J. The bi-planar lens 1002J may be formed by polishing the waveguide material at rate $R_W$, lens material at rate $R_L$, and dielectric material at rate $R_D$, wherein $R_L=R_W=R_D$.

Figure 11A:
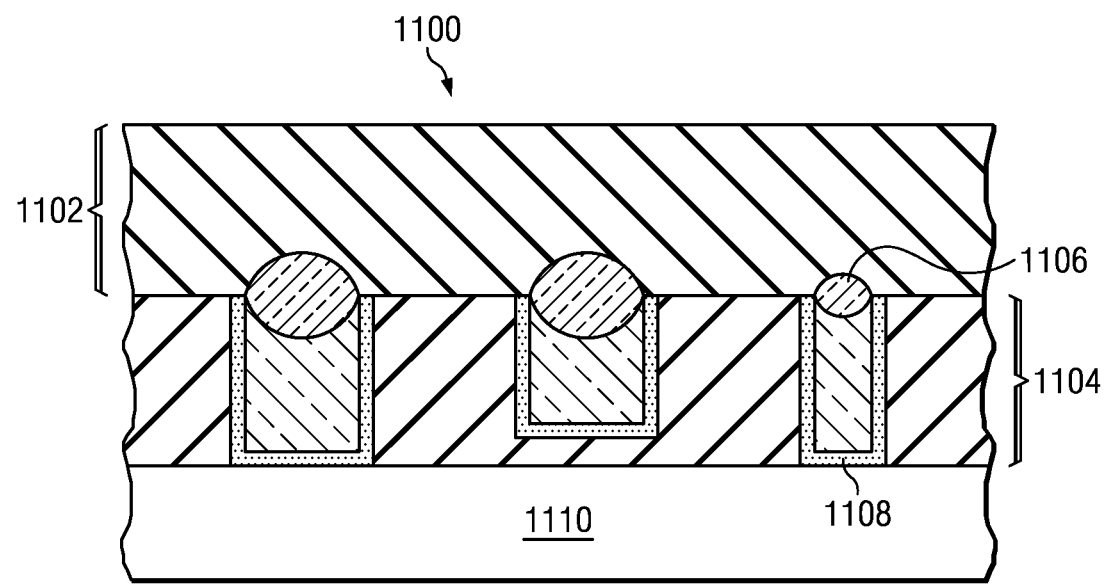
FIGS. 11A-11G illustrate the respective stages of fabrication of an example photonic integrated circuit in accordance with repeating steps provided in the flowchart presented in FIG. 1.
Figure 11B:
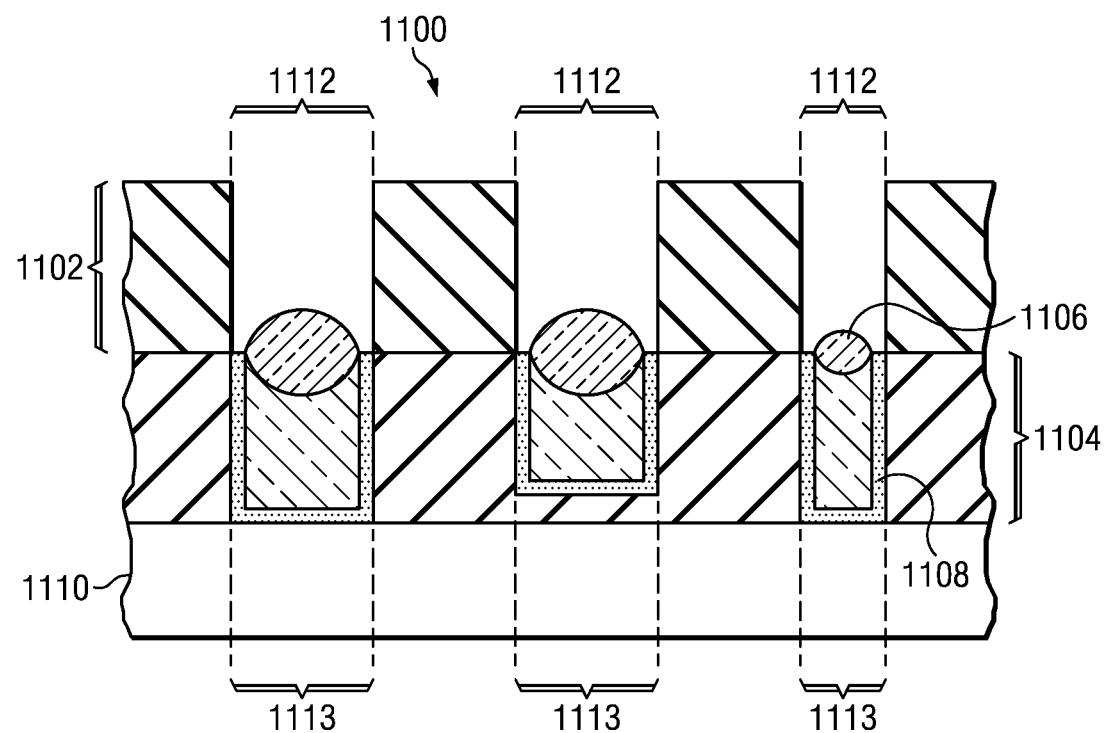

Reference is made now to step 108 in FIG. 1, wherein the method disclosed in the flowchart 100 either ends, or is repeated beginning at step 101 to produce additional optical circuitry. FIGS. 11A-11G illustrate the respective stages of fabrication of an example photonic integrated circuit 1100 in accordance with repeating steps 101-107. FIG. 11A illustrates the photonic integrated circuit 1100 in accordance with repeating step 101, wherein the circuit 1100 has a second layer of dielectric material 1102 deposited over a first layer of dielectric material 1104, first lenses 1106, a first cladding layer 1108, and underlying circuitry layer 1110. FIG. 11B illustrates the photonic integrated circuit 1100 in accordance with repeating step 102, wherein the circuit 1100 has second recesses 1112 formed within the second layer of dielectric material 1102. The recesses 1112 shown in FIG. 11B are vertically aligned with first recesses 1113 previously formed in the first layer of dielectric material 1104. One or more subsequently formed recesses (e.g. second recesses 1112) may be vertically aligned over previously formed recesses (e.g., first recesses 1113) to create waveguides of greater depth or size. Although it is not illustrated, it should be appreciated that, in some embodiments, some of the second recesses 1112 may not be vertically aligned with first recesses 1113, and that additional circuitry may be disposed between layers of dielectric material without departing from the scope of the present disclosure.

Figure 11C:
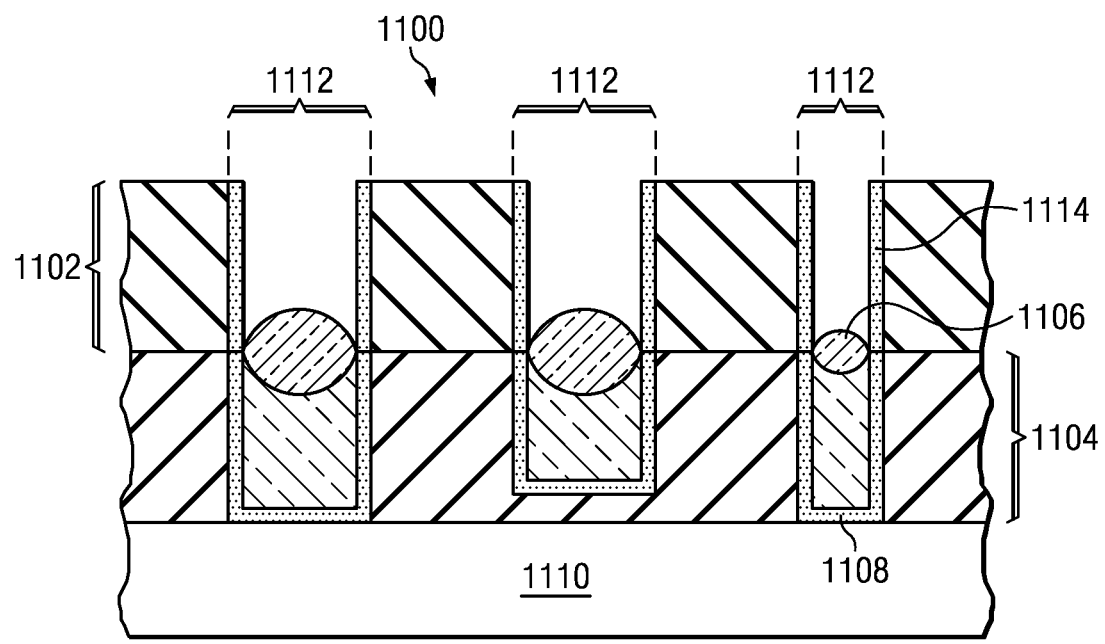

FIG. 11C illustrates the photonic integrated circuit 1100 in accordance with repeating step 103, wherein a second light barrier 1114 is deposited along the sidewalls of the second recesses 1112. It should be appreciated that in this, and similar, embodiments (i.e., those having a light barrier), any unwanted light barrier material (e.g., light barrier material deposited other than along a sidewall of a recess) may be removed using a method known in the art prior to the deposition of a subsequent layer of waveguide material. In the example embodiment illustrated in FIG. 11C, unwanted light barrier material has been removed from the top of the first lenses 1106 and second layer of dielectric material 1102 such that the light barrier 1114 is deposited along the sidewalls of the second recesses 1112. As discussed above, step 103 may be omitted in fabricating some embodiments of the disclosed photonic integrated circuit.

Figure 11D:
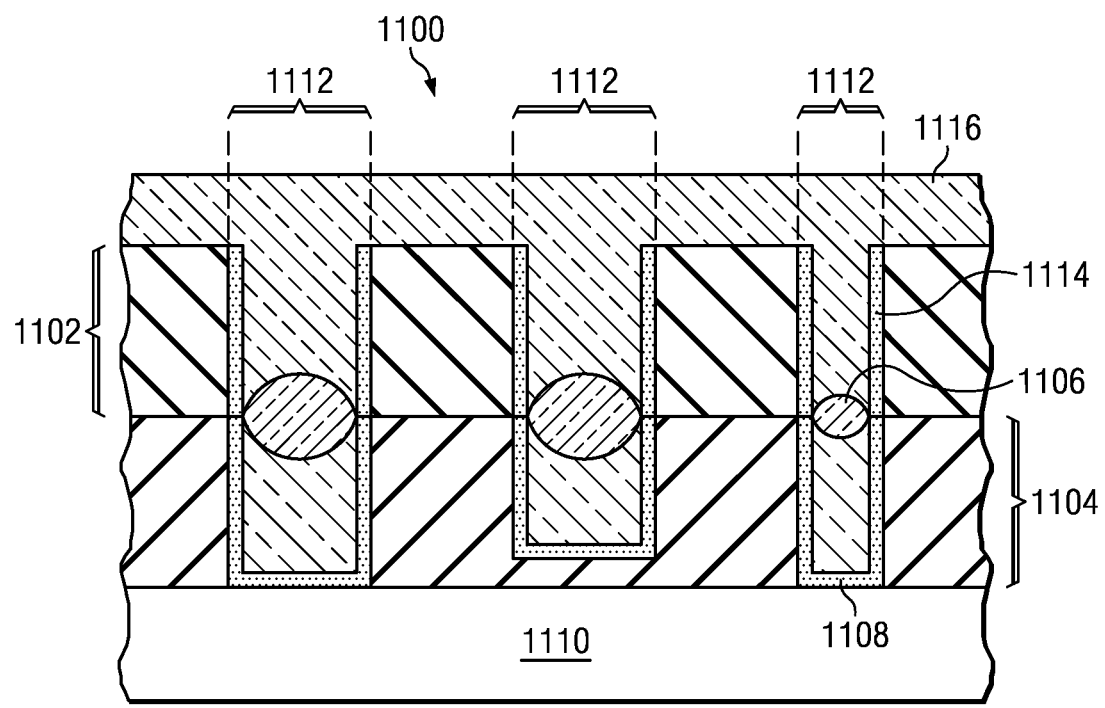
Figure 11E:
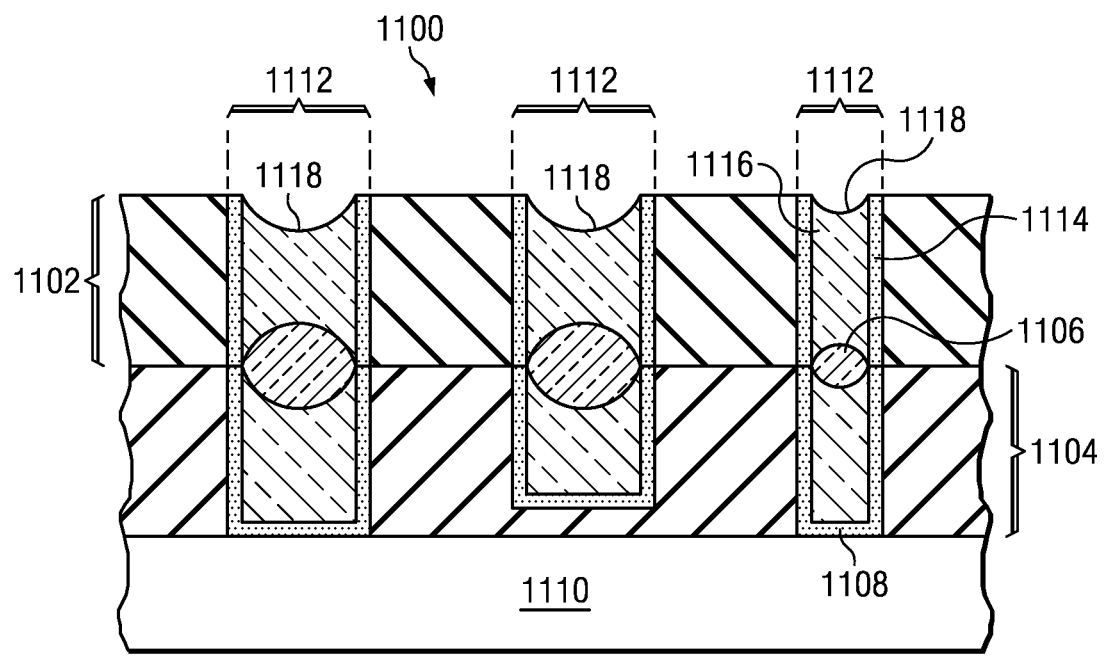

FIG. 11D illustrates the photonic integrated circuit 1100 in accordance with repeating step 104, wherein a second layer of waveguide material 1116 is deposited at least within the second recesses 1112. FIG. 11E illustrates the photonic integrated circuit 1100 in accordance with repeating step 105, wherein the second layer of waveguide material 1116 is polished to provide a curvature dishing 1118 within each of the second recesses 1112. As is discussed above, step 104 may be performed by first polishing the second layer of waveguide material 1116 until it is flush with the top surface of the second layer of dielectric material 1102, and then polishing the second layers of waveguide material 1116 in each recess 1112 at a first polish rate and the second layer of dielectric material 1102 at a second polish rate. It should be understood that the curvature dishing formed by repeating step 104 may be any curvature dishing in accordance with the present disclosure such as, for example, those illustrated in FIGS. 7A-7E.

Figure 11F:
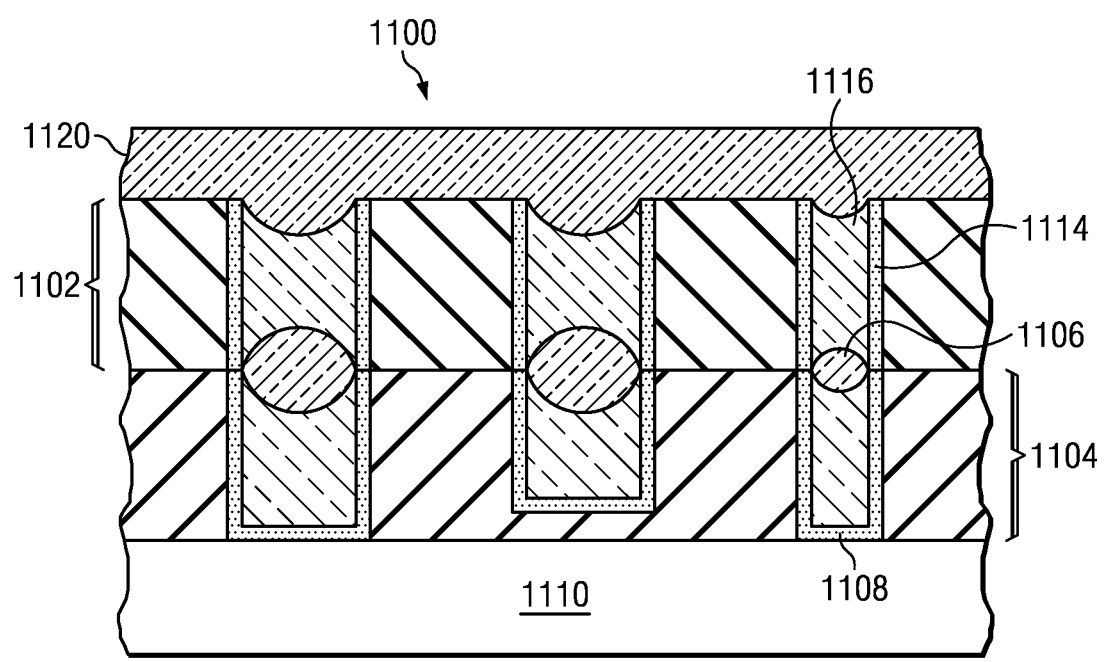
Figure 11G:
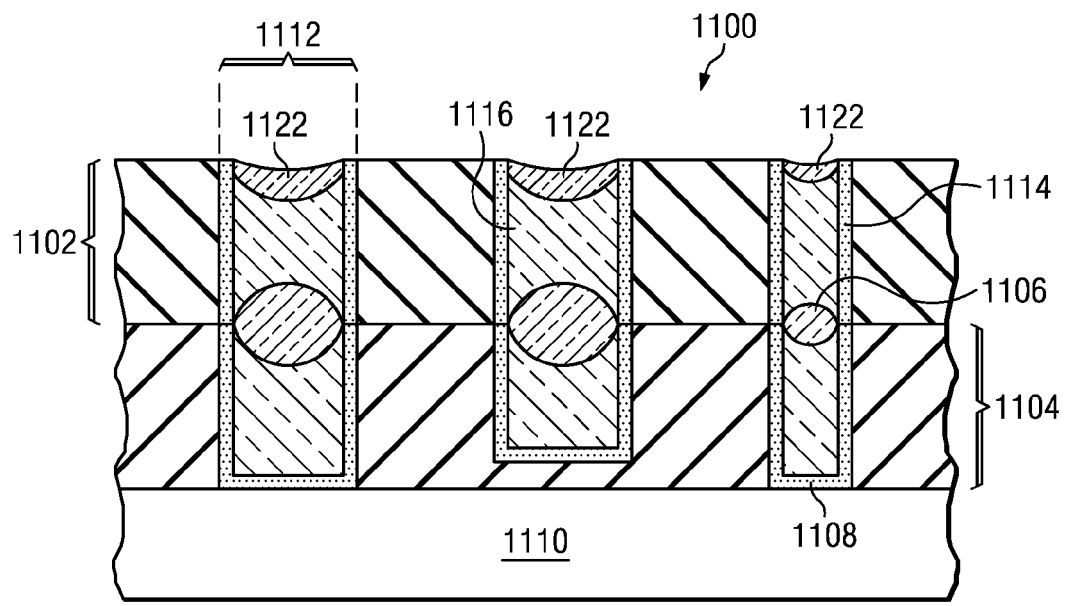

FIG. 11F illustrates the photonic integrated circuit 1100 in accordance with repeating step 106, wherein a second layer of lens material 1120 is deposited over the second layer of waveguide material 1116. FIG. 11G illustrates the photonic integrated circuit 1100 in accordance with repeating step 107, wherein the second layer of lens material 1120 is polished to create second lenses 1122. The second lenses 1122 are not limited to the curvature or lens-type of the first lenses 1106, but may be selected to be any curvature or lens-type in accordance with the present disclosure such as, for example, any of the various example lenses illustrated in FIGS. 10A-10J. As such, the second lenses 1122 illustrated in FIG. 11G are shown as positive meniscus lenses similar to those provided in FIG. 10A.

Figure 12A:
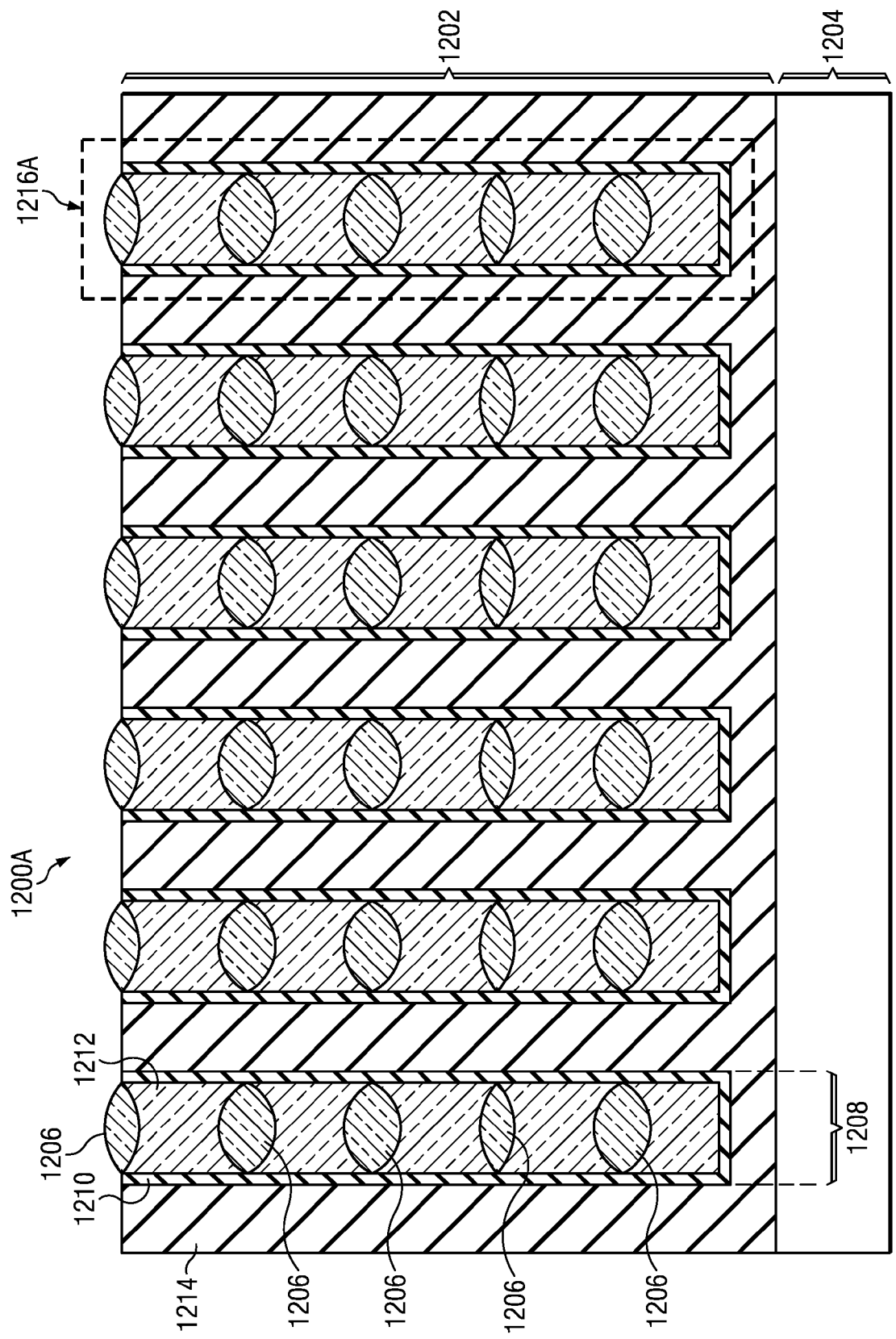
FIGS. 12A and 12B illustrate example embodiments of a photonic integrated circuit having a plurality of lenses.
Figure 12B:
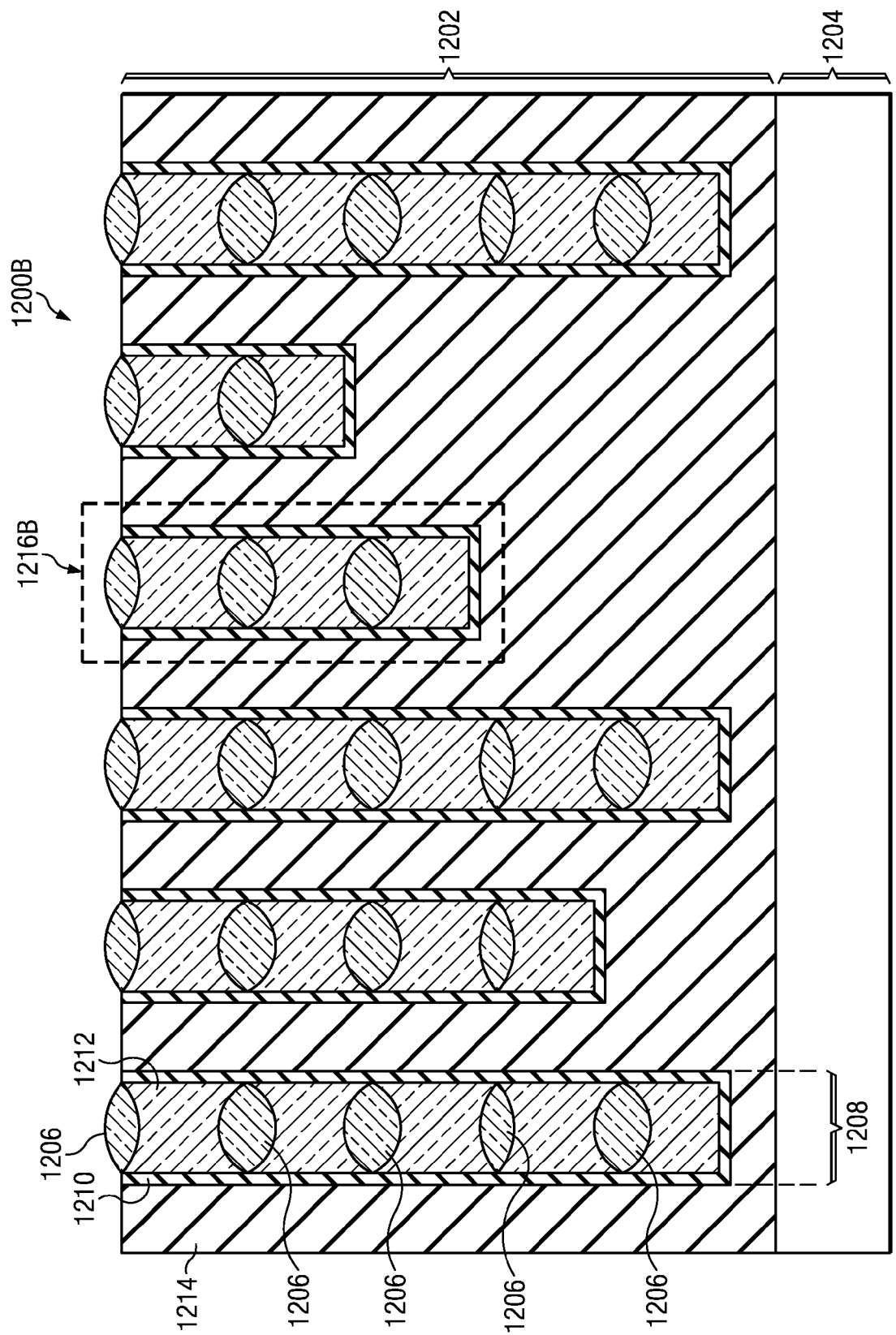

Steps 101-107 may be repeated several times to create various embodiments of photonic integrated circuits having multiple layers of optical circuitry, such as those generally illustrated in FIGS. 12A and 12B. The example embodiments of photonic integrated circuits 1200A and 1200B, shown in respective FIGS. 12A and 12B, are generally comprised of multiple layers of optical circuitry 1202 disposed over an underlying circuitry layer 1204. The optical circuitry 1202 illustrated in FIGS. 12A and 12B is shown having recesses 1208 (comprised of multiple vertically aligned recesses formed in layers of dielectric material 1214), light barriers 1210 deposited in the recesses 1208, multiple layers of waveguide material 1212, and multiple lenses 1206. It should be understood that the structure fabricated by the method disclosed herein, specifically, that comprising one or more vertically aligned layers of lenses, waveguide material, and, in some embodiments, a light barrier, may be referred to herein as a waveguide. The photonic integrated circuit 1200A illustrated in FIG. 12A shows six vertical waveguides 1216A of consistent depth or size, each having five layers of waveguide material 1212, five lenses 1206, and a light barrier 1210. The photonic integrated circuit 1200B illustrated in FIG. 12B shows six vertical waveguides 1216B of various depths or sizes, wherein the waveguides 1216B range from two layers (having two layers of waveguide material 1212, two lenses 1206, and a light barrier 1210) to five layers (having five layers of waveguide material 1212, five lenses 1206, and a light barrier 1210).

It should be appreciated that the flowchart 100 provided in FIG. 1 generally discloses a method for fabricating example embodiments of the disclosed photonic integrated circuit. As such, one or more steps may be altered or omitted when fabricating additional embodiments of the disclosed photonic integrated circuit. For example, in some embodiments, the photonic integrated circuit may not include a light barrier. Accordingly, a method for fabricating this particular embodiment may be similar to the method illustrated in FIG. 1, with the exception that step 103 may be omitted. Additionally, other embodiments may include a light barrier in only some of the recesses. It should also be appreciated that the example photonic integrated circuit embodiments disclosed herein may include any of the lens types disclosed, and are not limited to the specific lenses shown in any of the figures.

Figure 13:
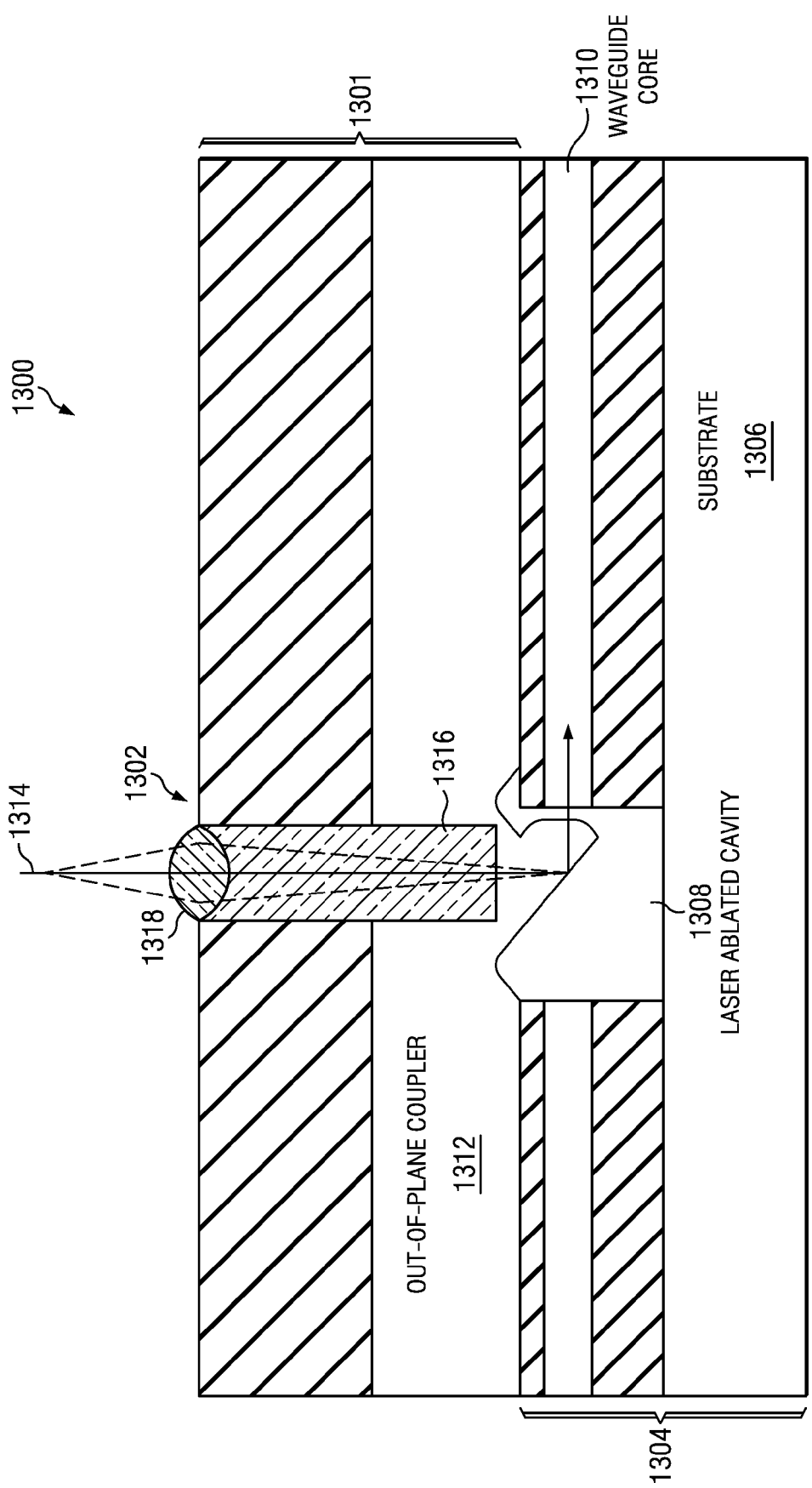
FIG. 13 illustrates a light-switching application of an embodiment of the disclosed photonic integrated circuit.

Photonic integrated circuits fabricated in accordance with the present disclosure may provide many advantages over existing photonic circuits. For example, the enhanced light propagation provided by the disclosed photonic integrated circuit results in efficient light direction switching. Thus, the disclosed method may be particularly useful for fabricating a photonic integrated circuit for light-switching applications such as, for example, that generally illustrated in FIG. 13. It should be understood that the embodiment illustrated in FIG. 13 is a partial illustration of a photonic integrated circuit 1300 having an optical circuitry layer 1301 disposed over an underlying circuitry layer 1304, wherein the underlying circuitry layer comprises a substrate 1306, a laser ablated cavity 1308, and a waveguide core 1310, and the optical circuitry layer 1301 comprises a waveguide 1302 and an out-of-plane coupler 1312. The waveguide 1302 may be fabricated in accordance with the disclosed method, wherein incident light 1314 is directed along waveguide material 1316 by lens 1318. In the example photonic integrated circuit 1300 illustrated in FIG. 13, the incident light 1314 is directed along the waveguide core 1310 by the out-of-plane coupler 1312. Although it is not shown in FIG. 13, it should be appreciated that the waveguide 1302 may comprise additional layers of waveguide material 1316, additional lenses 1318, and a light barrier. Additionally, the optical circuitry layer 1301 may include additional waveguides 1302 of various sizes as well as other optical circuitry.

Figure 14:
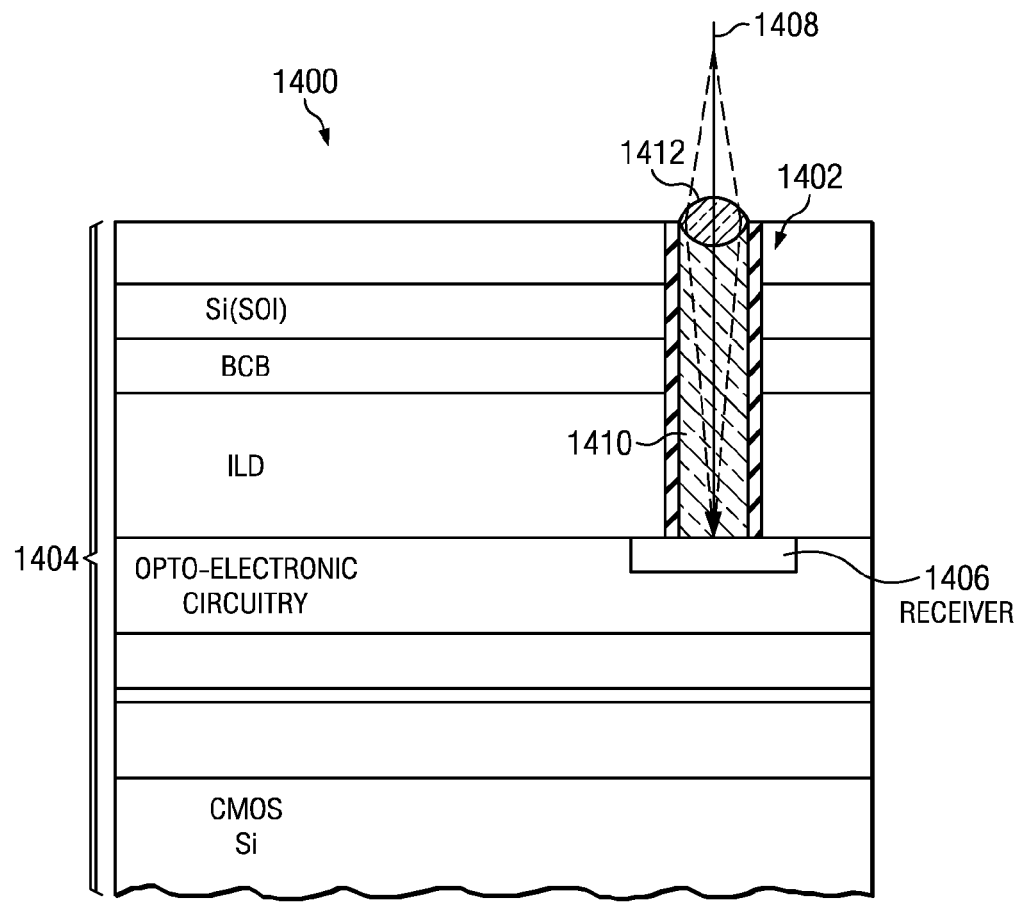
FIG. 14 illustrates a light-connection application of an embodiment of the disclosed photonic integrated circuit.

Additionally, photonic integrated circuits fabricated in accordance with the disclosed method provide efficient light connection means due to the enhanced light propagation resulting from reduced photon loss along the waveguide. Therefore, the disclosed method may also be useful for fabricating a light connector for optical 3D applications such as, for example, that generally illustrated in FIG. 14. The example embodiment illustrated in FIG. 14 is a partial illustration of a photonic integrated circuit 1400 having a waveguide 1402 disposed over (and at least partially within) an underlying circuitry layer 1404. As shown in FIG. 14, the underlying circuitry layer 1404 is comprised of several layers, including a layer of opto-electronic circuitry having a photonic receiver 1406. In this example embodiment, the waveguide 1402 is disposed over the photonic receiver 1406 such that incident light 1408 is directed along waveguide material 1410 by one or more lenses 1412. Although it is not shown in FIG. 14, it should be appreciated that the waveguide 1402 may comprise additional layers of waveguide material 1410, additional lenses 1412, and a light barrier. Additionally, the example photonic integrated circuit 1400 may include additional waveguides 1402 of various sizes or depths as well as additional circuitry.

Figure 15:
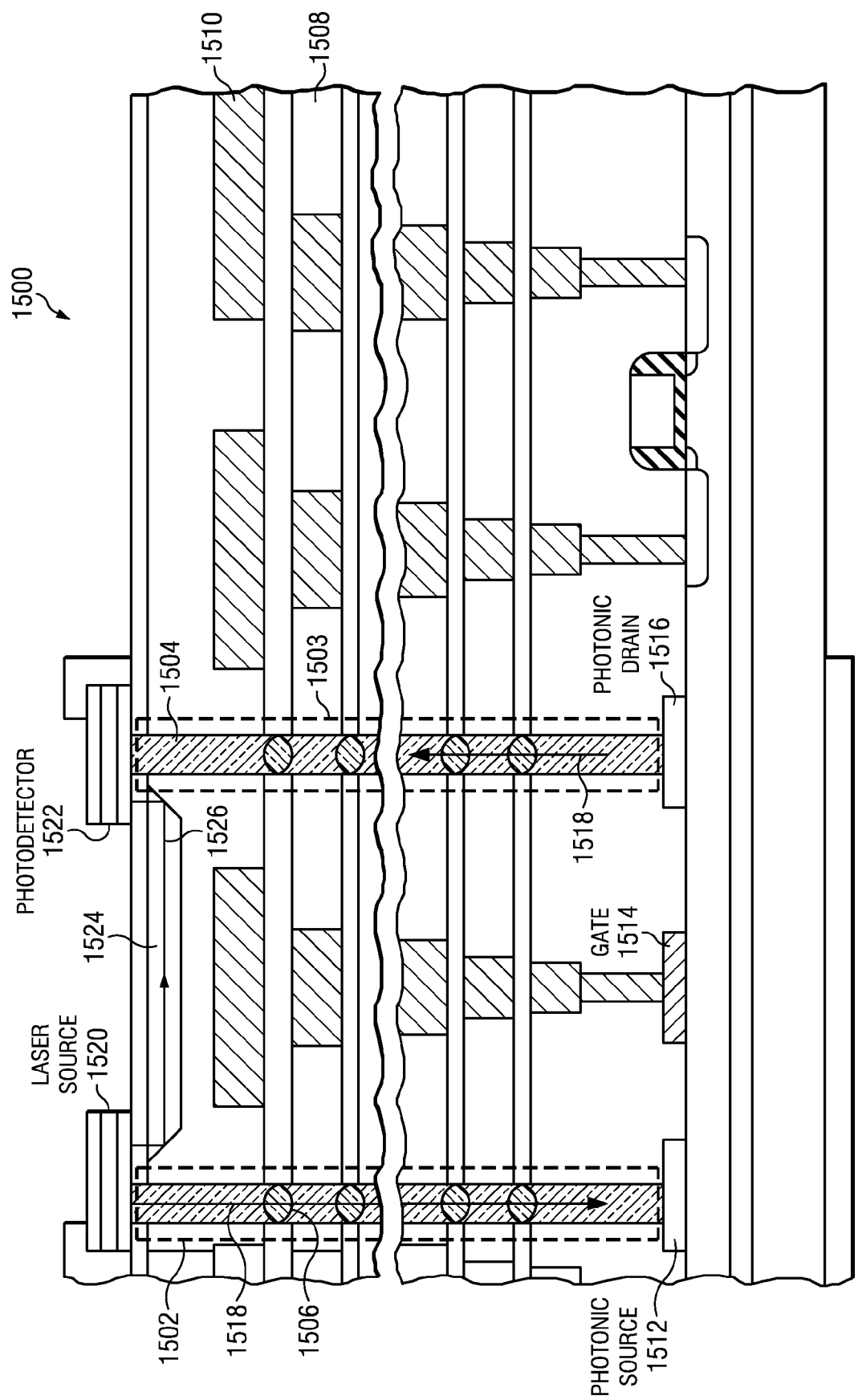
FIG. 15 illustrates an example embodiment of the disclosed photonic integrated circuit having additional circuitry.

It should also be appreciated that the disclosed photonic integrated circuit may include additional circuitry such as, for example, photonic sources, photonic drains, light sources, photodetectors, optical waveguides, and one or more metallization layers. Such additional circuitry is illustrated in the example photonic integrated circuit 1500 provided in FIG. 15. As shown in FIG. 15, the example photonic integrated circuit 1500 comprises first and second vertical waveguides 1502 and 1503 having n vertically aligned layers of waveguide material 1504 and n vertically aligned lenses 1506 formed within n layers of dielectric material 1508. The photonic integrated circuit 1500 also comprises n metallization layers 1510, and other circuitry such as, for example, a photonic source 1512, gate 1514, and a photonic drain 1516. In the example photonic integrated circuit 1500 in FIG. 15, incident light 1518 is provided by a light source such as, for example, laser source 1520 vertically aligned with the first waveguide 1502. The incident light 1518 is optically transmitted (i.e., propagated) along the first waveguide 1502, and is received at the photonic source 1512. The second waveguide 1503 receives the incident light 1518 from the photonic drain 1516, and propagates it to a photodetector 1522 vertically aligned with the second waveguide 1503. The photonic integrated circuit 1500 also comprises a horizontal optical waveguide 1524 formed between the laser source 1520 and photodetector 1522 as shown in FIG. 15, wherein the optical waveguide 1524 is operable to provide a control or reference light 1526. The reference light 1526 is compared with the light 1518 received from the photonic drain 1516 to provide a way to measure or evaluate the incident light 1518. Although it is not shown in FIG. 15, it should be appreciated that the waveguides 1502 and 1503 may comprise light barriers. Additionally, the example photonic integrated circuit 1500 may include additional waveguides of various depths and sizes as well as other circuitry.

What is claimed is:

1. A method, comprising the steps of:
   (a) depositing a layer of dielectric material;
   (b) forming a recess within said layer of dielectric material;
   (c) depositing a layer of waveguide material within said recess to form an optical waveguide;
   (d) polishing a surface of said waveguide material to form a first surface curvature for said optical waveguide;
   (e) depositing a lens material over the polished waveguide material, said lens material having a lower surface with a lower surface curvature conforming to said first surface curvature; and
   (f) polishing an upper surface of said lens material to form an upper surface with an upper surface curvature, said upper and lower surfaces defining a lens that is aligned with said optical waveguide.

2. The method as set forth in claim 1, further comprising repeating steps (a) through (f) one or more times.

3. The method as set forth in claim 2, further comprising repeating steps (a) through (f) one or more times with the recesses being vertically aligned.

4. The method as set forth in claim 1, further comprising depositing a cladding layer between the layer of waveguide material and a sidewall of said recess.

5. The method as set forth in claim 4, wherein depositing a cladding layer comprises depositing one or more alternating layers of a first cladding material having a first refractive index and a second cladding material having a second refractive index.

6. The method as set forth in claim 5, wherein said first cladding material comprises dielectric material.

7. The method as set forth in claim 5, wherein said second cladding material comprises a Bragg cladding material.

8. The method as set forth in claim 1, further comprising depositing one or more metallization layers within said recess.

9. The method as set forth in claim 1, wherein the step (d) of polishing the surface of said waveguide material comprises polishing said dielectric material at a first rate and polishing said waveguide material at a second rate different than said first rate.

10. The method as set forth in claim 1, wherein the step (d) of polishing the surface of said waveguide material comprises polishing said dielectric material at a first rate and polishing said waveguide material at a second rate equal to said first rate.

11. The method as set forth in claim 1, wherein the step (f) of polishing the surface of said lens material comprises polishing said dielectric material at a first rate and polishing said lens material at a second rate less than said first rate.

12. The method as set forth in claim 1, wherein the step (f) of polishing the surface of said lens material comprises polishing said dielectric material at a first rate, polishing said waveguide material at a second rate, and polishing said lens material at a third rate greater than said first rate and less than said second rate.

13. The method as set forth in claim 1, wherein said lower surface curvature is defined by a polish rate for the step (d) of polishing the surface of said waveguide material.

14. The method as set forth in claim 1, wherein said upper surface curvature is defined by a polish rate for the step (f) of polishing the surface of said lens material.

15. The method as set forth in claim 1, wherein the steps (d) and (f) of polishing is performed via a chemical mechanical polishing process.

16. The method as set forth in claim 1, wherein said lower surface curvature is planar.

17. The method as set forth in claim 1, wherein said lower surface curvature is convex.

18. The method as set forth in claim 1, wherein said lower surface curvature is concave.

19. The method as set forth in claim 1, wherein said upper surface curvature is planar.

20. The method as set forth in claim 1, wherein said upper surface curvature is convex.

21. The method as set forth in claim 1, wherein said upper surface curvature is concave.

22. The method as set forth in claim 1, wherein step (a) of depositing the layer of dielectric material comprises depositing the dielectric material on a front end of line (FEOL) integrated circuit structure.

23. The method as set forth in claim 1, wherein said steps (a)-(f) are performed in a back end of line (BEOL) integrated circuit manufacturing process.

24. The method as set forth in claim 1, wherein step (a) of depositing the layer of dielectric material comprises depositing the dielectric material on a first optical circuit device, and wherein step (b) of forming the recess comprises forming the recess to expose at least a portion of the first optical circuit device.

25. The method as set forth in claim 24, wherein said first optical circuit device is selected from the group consisting of a photonic source and a photonic drain.

26. The method as set forth in claim 24, further comprising forming in a position optically coupled to the optical waveguide of a second optical circuit device.

27. The method as set forth in claim 1, wherein step (a) of depositing the layer of dielectric material comprises depositing the dielectric material on an out of plane coupler, and wherein step (b) of forming the recess comprises forming the recess to extend into said out of plane coupler.

* * * * *